CLAMPING DEVICE

Filed Sept. 16, 1965

INVENTORS
CHARLES WERMUTH
HEINZ WAGNER
FRANZ ARNOLD
BY
Woodhams, Blanchard and Flynn
ATTORNEYS INVENTORS
CHARLES WERMUTH
HEINZ WAGNER
FRANZ ARNOLD
BY
Woodhams, Blanchard and Flynn
ATTORNEYS INVENTORS
CHARLES WERMUTH
HEINZ WAGNER
FRANZ ARNOLD
BY
Woodhams, Blanchard and Flynn
ATTORNEYS 3,416,784

CLAMPING DEVICE

Charles Wermuth, Wangi, Switzerland; Heinz Wagner, Santisstr., Aadorf, Switzerland; and Franz Arnold, Spatzenweg 48, Kempten, Bavaria, Germany Filed Sept. 16, 1965, Ser. No. 487,778
Claims priority, application Germany, Sept. 25, 1964, G 41,606
8 Claims. (Cl. 269—136)

ABSTRACT OF THE DISCLOSURE

A deep clamping jaw, especially for use on a vice, in which a bearing plate is secured to either the head or slide of the vice. A clamping jaw is arranged parallel to and spaced from the bearing plate with a pair of support members being provided therebetween so that application of pressure to the clamping jaw permits same to move in a direction substantially parallel to the bearing plate. A resilient sealing member is disposed within the space between the bearing plate and the clamping jaw and seals the space on all sides thereof. Fastening means, such as bolts, pass through the clamping jaw and the bearing plate to connect same to the head or slide of the vice.

This invention relates to a deep clamping jaw and more specifically a clamping jaw for use in machine vices, which is mounted for displacement in height on a bearing plate secured to the head and the slide of the vice, respectively, so that the jaw is downwardly pressed under the action of the clamping pressure against spring resistance.

In a known deep clamping jaw arrangement, the deep clamping jaw is movably mounted in an inclined guideway in the bearing plate. This structure has the disadvantage that in view of the small slope of said inclined guideway, the reliable operation of said deep clamping jaw is impaired by the considerable friction occurring between the deep clamping jaw and the bearing plate. Yet this reliable operation is further considerably called in question because due to the chips falling into the inclined guideway, as well as owing to rust formation, the frictional forces existing in the inclined guideway are further increased considerably.

In order to decrease these frictional forces, it has been proposed to use a horizontal roll as a deep clamping jaw, which is supported on the workpiece, on one hand, and on the inclined surface of a bearing plate, on the other. However, this structure has the disadvantage that merely a line contact exists between the roll-shaped clamping jaw and the workpiece, hence a very high surface pressure is produced so that the workpiece will be damaged when clamped. Also in this structure, the reliable deep clamping effect is impaired by falling-in chips and rust.

The aforementioned disadvantages of the above-mentioned structures are eliminated by the present invention, according to which the clamping jaw and the bearing plate are arranged parallel to each other, a pair of horizontal grooves are provided on each of the sides confronting each other, the grooves are arranged in pairs displaced in height with respect to each other, and two support members are provided, which are supported in the transversely oppositely disposed grooves so that they form a parallelogram mounting for the jaw.

In a particularly advantageous embodiment according to the invention, the support members are cylindrical rollers, while the bearing surfaces of the grooves have a radius of curvature that is larger than the radius of curvature of the rollers.

The structure according to the invention leads to a perfect deep clamping effect, and the detrimental sliding friction is avoided to a far-reaching extent, while by the parallelogram mounting the clamping jaw exactly maintains its vertical position during the clamping operation. Furthermore, the invention permits a compact construction, in which moreover the support members or rollers are completely sealed by sealing means provided between the clamping jaw and the bearing plate and are thus protected against admission of chips, cooling fluid and the like.

The details of the invention and its advantages are elucidated in greater detail hereinafter in conjunction with the attached drawing which shows exemplary embodiments and in which.

Figure 2:
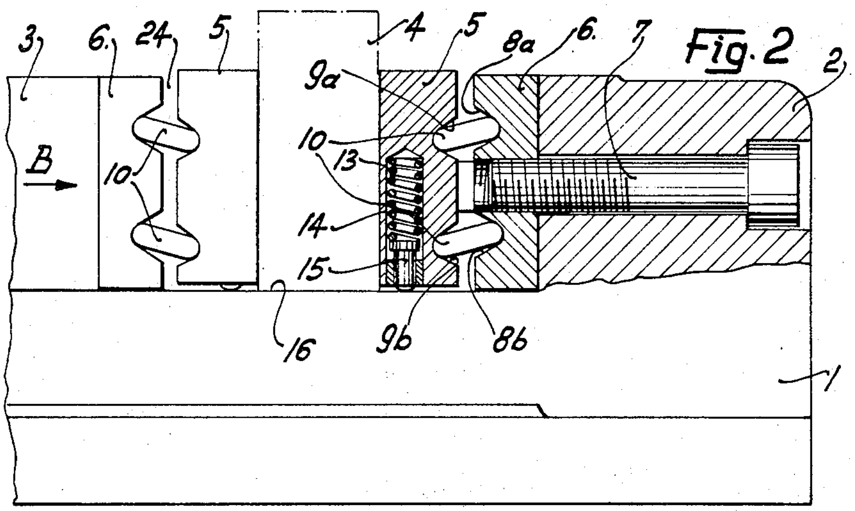
FIG. 2 is the appertaining front view, partly in section.
Figure 1:
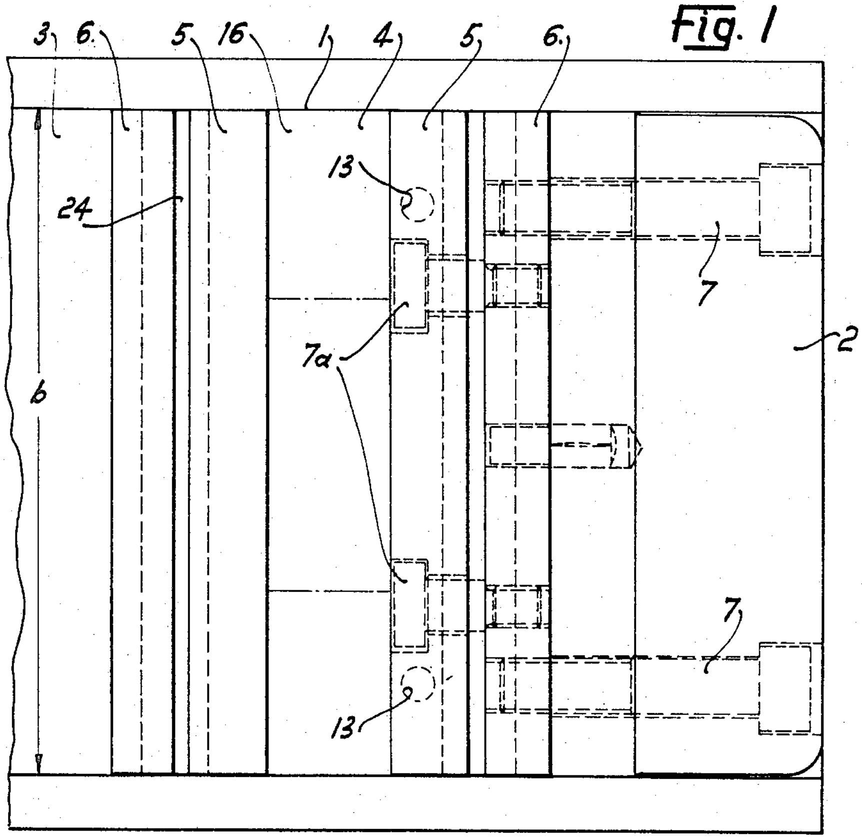
FIG. 1 is a partial plan view of a machine vice together with the deep clamping jaw.

In FIGURES 1, 2 and 11, 12, respectively, is represented a machine vice, the base plate of which is indicated by 1, and the head member rigidly connected thereto is indicated by 2, while the slide of said vice, which is movable in the direction B, is indicated by 3. A workpiece to be clamped is indicated at 4. According to FIGS. 1 and 2, there are provided deep clamping jaws 5 mounted on bearing plates 6. The latter are rigidly connected to the head 2 and to the slide 3, respectively, of the vice by, e.g., screw bolts 7, while the clamping jaw 5 is secured to the bearing plate 6 by screws 7*a*.

Figures 3, 4, 5, 6, 7, 8, 9, 10:
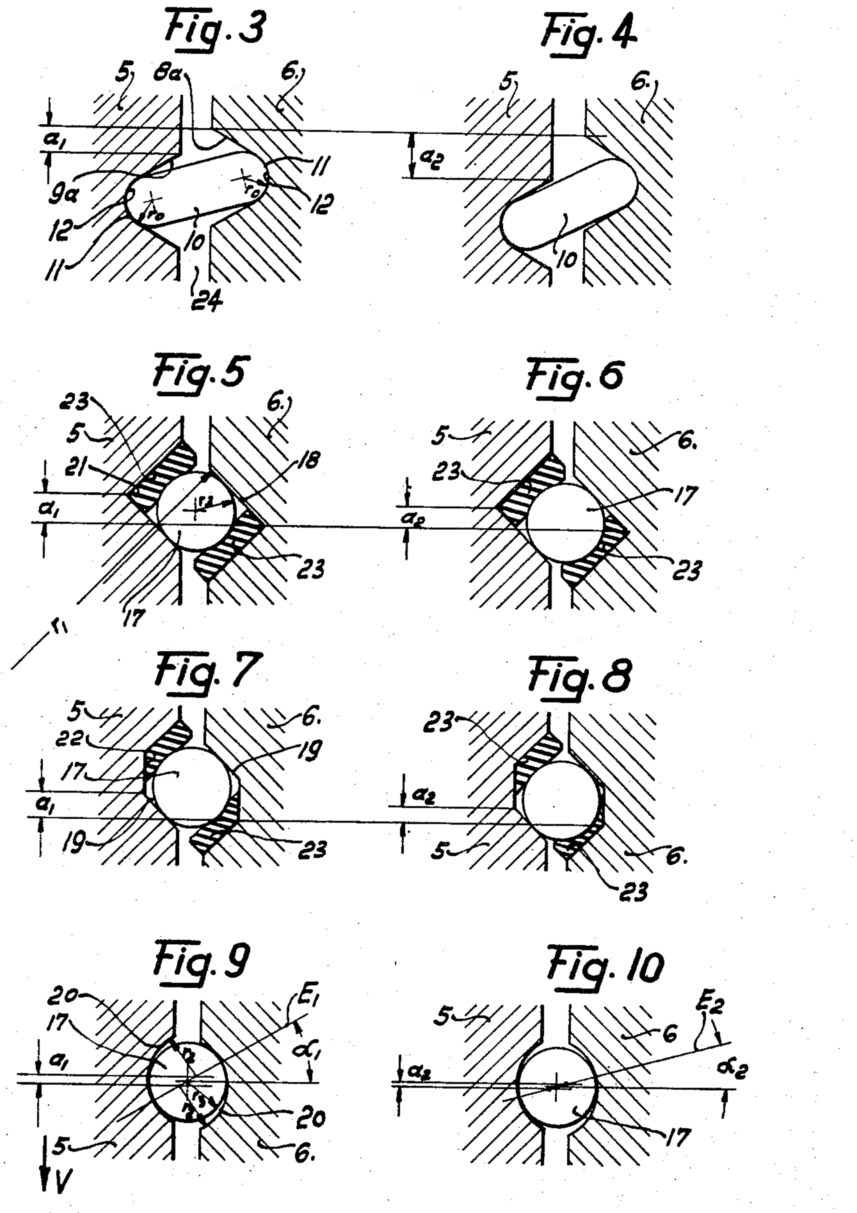
FIG. 3 is a sectional view from FIGURE 2 (deep clamping jaw) on an enlarged scale, prior to clamping.
FIG. 4 is the same deep clamping jaw in the clamped condition.
FIGS. 5 and 6 are a second embodiment of a deep clamping jaw in the unclamped and clamped condition, respectively.
FIGS. 7 and 8 are a third embodiment in the same representation.
FIGS. 9 and 10 are a further embodiment in the same representation.

As is evident from the drawing, the clamping jaw 5 and the bearing plate 6 are arranged parallel to each other, while one pair of horizontal grooves 8*a*, 8*b* and 9*a*, 9*b*, respectively, is provided on each of those sides of the clamping jaw 5 and the bearing plate 6, that are confronting each other, the pair of grooves 8*a*, 8*b* being displaced in height with respect to the pair of grooves 9*a*, 9*b*. Further, 2 support members are provided, which are supported in the transversely oppositely disposed grooves so that they form a mounting or guide for the jaw 5. The grooves 8*a*, 8*b*, 9*a*, 9*b* and the support members 10 extend along approximately the full breadth *b* of the jaw 5 of the bearing plate 6, respectively. As shown in FIGS. 2 and 3, the support members 10 have semi-cylindrical pressure surfaces 11, and the grooves 8*a*, 8*b*, 9*a*, 9*b* have corresponding semi-cylindrical bearing surfaces 12, while the radii $r_0$ of curvature of said pressure and bearing surfaces 11, 12 are equal in size.

In order to hold the clamping jaw 5, in the unclamped condition in the upper position shown in FIGS. 2 and 3, a corresponding pressure spring is provided. In the represented exemplary embodiment, helical pressure springs 14 are provided in the two vertical bores 13 and act on a displaceable pressure pin 15 which abuts the top side 16 of the base plate 1.

In the unclamped condition according to FIG. 3, the grooves in the clamping jaw 5 and in the bearing plate 6—which serve for bearing the support members 10—are displaced by a dimension $a_1$. When the slide 3 is moved in the direction B by suitable means, then a displacement of the parallel support members 10 takes place under the action of the clamping pressure so that the support members 10 are forced from the position shown in FIG. 3 into the position shown in FIG. 4. Accordingly, the groove distance $a_1$ will be increased to the magnitude $a_2$, so that the two clamping jaws 5 according to FIGURE 2 will be positively urged downwardly by the value $a_2-a_1$ so that the workpiece 4 will be firmly pressed downwardly against the upper side 16 during this clamping operation.

In the advantageous embodiments according to the invention as shown in FIGURES 5–12, the support members of the parallelogram mounting consist of cylindrical rollers 17, while the groove bearing surfaces 18, 19, 20 have a radius $r_1$ and $r_2$ of curvature, respectively, which is larger than the radius $r_3$ of curvature of said rollers. In this embodiment, the clamping jaw 5 and the bearing plate 6 are forming a roller bearing with the rollers 17. The members 5, 6 and 17 are made advantageously of hardened steel.

In the embodiment shown in FIGURES 5, 6, the clamping jaw 5 and the bearing plate 6 include wedge-like grooves 21, while in the embodiment shown in FIGS. 7, 8, they include trough-shaped grooves 22. Plane bearing surfaces 18, 19 are provided in these two embodiments, so that the radius $r_1$ of these bearing surfaces is infinite. In order that the rollers 17 are held in their normal position according to FIGS. 5 and 7, or pressed back in this position, respectively, pads 23 of elastic rubber material can be arranged in the grooves 21, 22 of the represented exemplary embodiment. These means for holding the rollers 17 in the normal position are omitted in the particularly advantageous embodiment shown in FIGS. 9–12. The bearing surfaces 20 in this structure of the rollers have a radius $r_2$ which is only slightly larger than the radius $r_3$ of the rollers. The radii $r_3$ and $r_4$ in a structure for the practical embodiment of the present invention, e.g., have the proportion 4:5.

The plane of contact of the roller bearing elements is indicated at $E_1$ and $E_2$ in FIGURES 9 and 10. It will be apparent that in this deep clamping operation, the angle of inclination of said plane decreases from $a_1$ to $a_2$. Accordingly, in view of these varying angles, the force which is produced during the clamping operation and which urges the jaw 5 downwardly in the direction V is correspondingly decreased. Yet since the horizontal clamping force in the direction B is increased when the workpiece is being clamped, the deep clamping force in the direction V practically remains approximately constant.

Figures 11, 12:
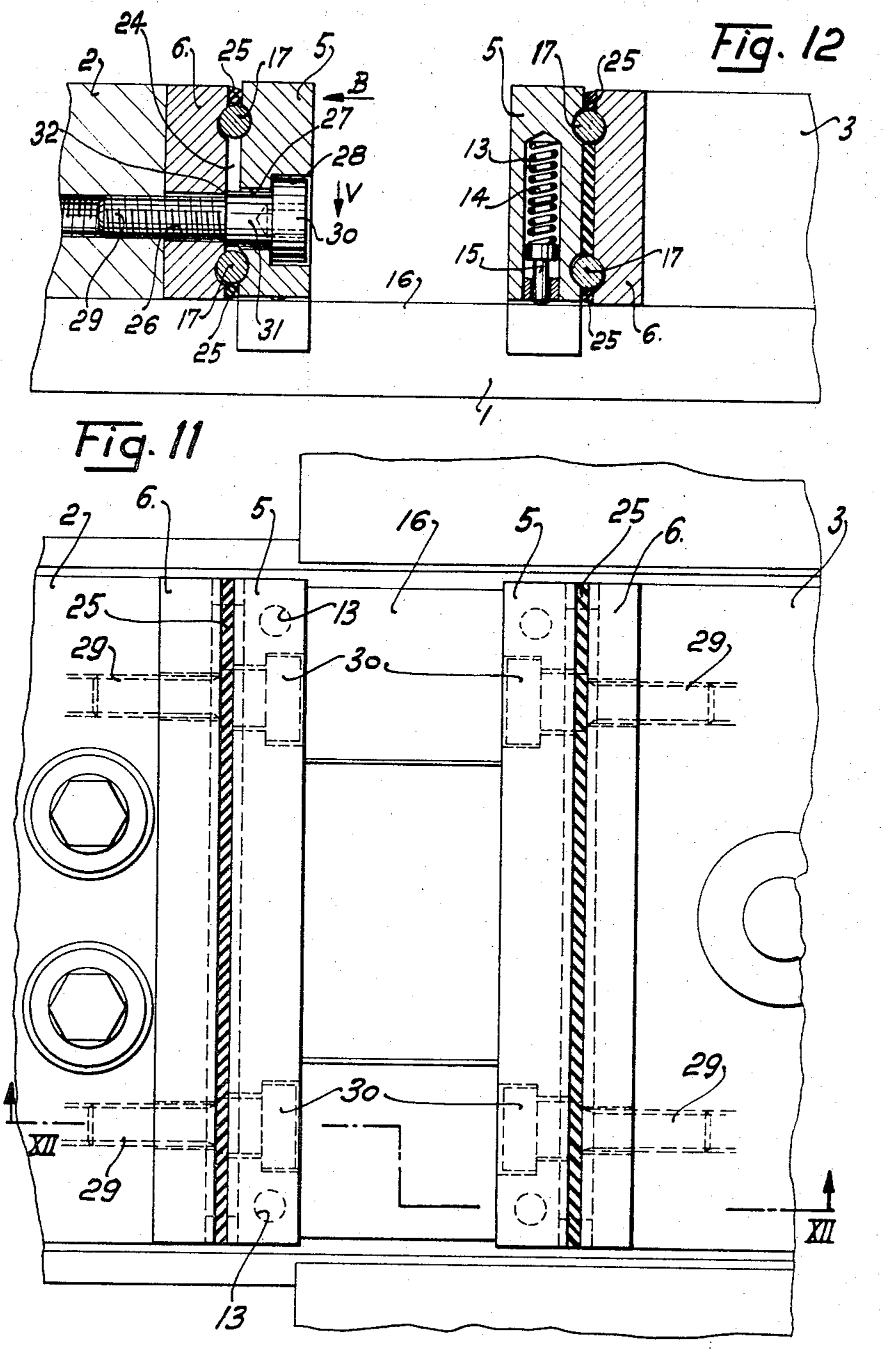
FIG. 11 is a partial plan view of a machine vice together with a deep clamping jaw in the embodiment according to FIG. 9.
FIG. 12 is a longitudinal view along the line XII—XII of FIG. 11.

All of the exemplary embodiments described hereinbefore have the advantage that the interspace 24 existing between the clamping jaw 5 and the bearing plate 6 can be sealed by sealing means against admission of chips, cooling fluid and the like. To this end, said interspace between the jaw and the bearing plate is filled with a frame-like sealing member 25 of a resilient compressible material, such as a rubber-elastical material, surrounding the pair of support bodies 10 and 17, respectively, at all sides, as shown in FIGURES 11 and 12. The jaw 5, the bearing plate 6 and the sealing means 25 are advantageously bonded firmly by an adhesive to form a unit. This has the advantage that not only a reliable seal is provided, but also the unit consisting of the clamping jaw 5, the bearing plate 6, the support or roller members 10, 17 can be connected to the head or the slide, respectively, of the machine vice. To this end, FIGURES 11 and 12 show bores 26 through the bearing plate 6 and coaxial step bores 27, 28 in the jaw 5, provided for fastening screws. The latter include a collar 31 which is provided between the threaded shaft 29 and the screw head 30 so that the bearing plate 6 can be firmly clamped on the head 2 and the slide 3, respectively, by means of the end face 32 of said collar as illustrated in FIGURE 12, while the screw head 30 countersunk in the jaw 5—that is, in the step bore 28—holds the jaw 5 in the unclamped position. Thus, during the action of the clamping pressure in the direction B, the deep clamping jaw 5 is freely movable with respect to members 30, 31 of the fastening screws in the direction B as well as in the direction V.

What we claim is:

1. A deep clamping jaw, particularly adapted for use with a machine vice having a head and a slide movable relative to said head, comprising:

a bearing plate;

a clamping jaw arranged parallel to and spaced from said bearing plate so as to define a space therebetween;

support means extending between said bearing plate and said clamping jaw within said space for permitting movement of said clamping jaw in a direction substantially parallel to said bearing plate when pressure is applied to said clamping jaw;

resilient sealing means of compressible material positioned within said space in sealing engagement with said bearing plate and said clamping jaw; and fastening means for connecting said clamping jaw and said bearing plate to one of said head and slide.

2. A deep clamping jaw, comprising:

a frame;

first and second laterally spaced bearing plates mounted on said frame, one of said bearing plates being mounted for lateral movement toward and away from said other bearing plate;

first and second laterally spaced clamping jaws arranged between said bearing plates, said first and second jaws being substantially parallel to and spaced from said first and second bearing plates, respectively, so as to define spaces therebetween;

first support means positioned within the space between said first bearing plate and said first clamping jaw for permitting movement of said first clamping jaw in a direction substantially parallel to said first bearing plate upon the application of pressure to said first clamping jaw;

second support means within the space between said second bearing plate and said second clamping jaw for permitting movement of said second clamping jaw in a direction substantially parallel to said second bearing plate upon application of pressure to said second clamping jaw; and resilent sealing means positioned within each of said spaces between said bearing plates and the respectice clamping jaws with said sealing means being in sealing engagement with both the bearing plate and the adjacent clamping jaw.

3. A deep clamping jaw as defined in claim 2, wherein the resilient sealing means within each of said spaces comprises a frame-like sealing member of compressible material surrounding said support means for completely enclosing same on all sides thereof.

4. A deep clamping jaw, particularly for use with a machine vise having a head and a slide with the slide being mounted for movement toward and away from said head, comprising:

a bearing plate;

a clamping jaw arranged parallel to and spaced from the bearing plate so as to define a space therebetween;

support means including support members positioned between and coupled to said bearing plate and said clamping jaw for permitting movement of said clamping jaw in a direction substantially parallel to said bearing plate upon application of pressure to said clamping jaw;

resilient sealing means for sealing and closing the space between said bearing plate and said clamping jaw on all sides, said resilient sealing means including a frame-like sealing member of resilient material arranged in the space between and in sealing engagement with the bearing plate and the clamping jaw; and fastening means for permitting said clamping jaw and said bearing plate to be connected to said machine vice, said fastening means including threaded fastening members extending through said clamping jaw and said bearing plate for permitting same to be connected to one of said head and slide.

5. A deep clamping jaw as defined in claim 4, wherein the sealing member is connected to the clamping jaw and the bearing plate by means of an adhesive so as to form an interconnected unit.

6. A deep clamping jaw according to claim 4, wherein said bearing plate and said clamping jaw each have a substantially rectangular cross section:

the confronting surfaces of said bearing plate and said clamping jaw each having two spaced-apart, substantially parallel grooves therein with said prooves extending substantially across the entire width of said bearing plate and said clamping jaw, each of said grooves being shallow and having a cross-sectional profile which constitutes a portion of a circle;

said support members including a pair of cylindrical support rollers with each of said rollers being positioned within one of the grooves formed in said bearing plate and in rolling engagement with the adjacent groove formed in said clamping jaw, said cylindrical support rollers having a radius of curvature which is slightly less than the radius of curvature of said grooves.

7. A deep clamping jaw as defined in claim 6, further including a bore formed in the bottom side of said clamping jaw:

a pressure pin movably arranged in said bore; and spring means arranged in said bore and coacting with said pressure pin for biasing same outwardly relative to said bore whereby the end of said pressure pin projects beyond the bottom side of said clamping jaw.

8. A deep clamping jaw as defined in claim 4, wherein said bearing plate and said clamping jaw are provided with a plurality of bores extending therethrough, the bores of said clamping jaw being of larger diameter than the bores of said bearing plate, the bores in said clamping jaw further being provided with countersunk enlarged recesses adjacent the surface of said clamping jaw remote from said bearing plate:

said threaded fastening members comprising fastening screws each having a threaded portion, a head portion and a collar between said threaded portion and said head portion, each of said fastening screws extending through one of the bores formed in said clamping jaw and one of the bores formed in said bearing plate, said head being positioned within the recess formed in said clamping jaw with the end of said collar remote from said head being in abutting engagement with said bearing plate whereby said fastening screws firmly hold said bearing plate in position; and said countersunk recesses being larger than said heads whereby said clamping jaw is held in an unclamped position so as to permit same to move in a direction substantially parallel to said bearing plate.

References Cited

UNITED STATES PATENTS 1,692,398 11/1928 Weaver ---------- 269—135 X

FOREIGN PATENTS 1,022,977 1/1958 Germany.
552,251 3/1943 Great Britain.

ROBERT C. RIORDON, *Primary Examiner.*

JAMES F. McKEOWN, *Assistant Examiner.*

U.S. Cl. X.R.

269—282, 285